Oct. 31, 1967  R. J. WRAY ET AL  3,350,054
PNEUMATICALLY OPERATED SERVO-CONTROL DEVICES FOR VALVES
Filed Oct. 19, 1965
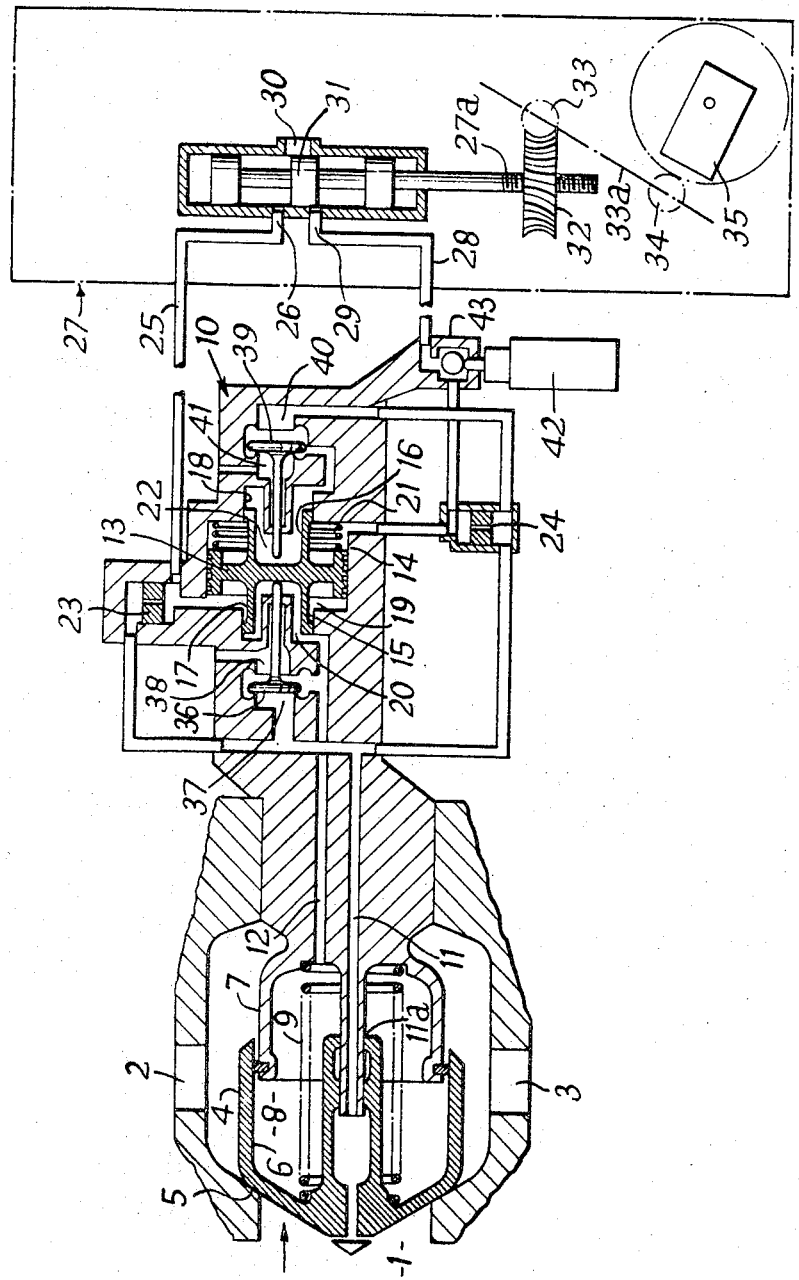

3,350,054
PNEUMATICALLY OPERATED SERVO-CONTROL DEVICES FOR VALVES

Ronald J. Wray, Southampton, and Leonard T. Tribe, Waltham Chase, near Southampton, England, assignors to The Plessey Company Limited, Ilford, England, a British company
Filed Oct. 19, 1965, Ser. No. 497,678
Claims priority, application Great Britain, Nov. 4, 1964, 44,969/64
4 Claims. (Cl. 251—29)

ABSTRACT OF THE DISCLOSURE

To safeguard a bleed-air cut-off valve which is located closely adjacent to an aircraft jet engine and is operated by bleed-air pressure under the control of a pneumatically remote-controlled local control valve against fracture of one or both remote-control lines, the control valve is actuated in each direction by a main piston under the remote-control pressure and is further provided with two auxiliary piston means of smaller area to which similar pressure is admitted by switch valves respectively opened by the action of the control valve at the end of each stroke to load the valve element towards the end position it has reached. A pilot-controlled supplementary valve permits unloading of one of the auxiliary piston means, thus allowing manual interference to open the cut-off valve after failure of the remote-control pressure.

---

This invention relates to pneumatically operated servo-control devices for a valve and is more particularly, though not exclusively, intended to provide an improved control device for the supply of bleed air from the turbo compressor of one or more turbo-jet engines to the so-called puffer duct system in V.T.O.L. aircraft. In the operation of V.T.O.L. aircraft, in which the transition between horizontal flight and take-off or landing is effected by tilting at least the nozzle for the jet stream produced by a jet engine or engines of the aircraft, it is well known that during take-off and landing conditions, in which the horizontal speed of this kind of aircraft is very low, the ailerons which during normal flight ensure stability of the aircraft, are inoperative, and it is therefore the general practice to replace their effect under such conditions by the operation of so-called puffer ducts. These ducts are fed with bleed air from the jet engine compressor or compressors and produce when operative more or less vertical jet streams of low power at selected points remote from the centre of gravity of the aircraft, for example at the wing tips to correct the bank angle and at the ends of the fuselage to correct the pitch angle of the aircraft. In order to ensure the availability of maximum engine power during horizontal flight when the operation of the puffer duct is not required, the admission of engine bleed air to the puffer-duct system is controlled by a puffer-duct valve which is arranged to be closed under horizontal-flight conditions and opened only under conditions in which a substantial proportion of the jet force is utilised for direct support of the aircraft, that is to say, when the angle of the jet axis to the "horizontal" main plane of the aircraft exceeds a predetermined value. In view of the considerable size of the puffer duct valve, it is operated by servo action, for which purpose engine-bleed air pressure may conveniently be employed.

Since the puffer-duct valve is arranged in close vicinity to the engine, supply of compressor bleed air to it is normally ensured so long as the engine itself is operative, but in order to allow the pilot to control the servo action, remote-control connection to the pilot's position is required. Such remote control is conveniently also effected by means of compressor bleed-air, but in view of the length of this connection, the risk of breakage of one of the control ducts in appreciable.

The present invention has for an object to provide an improved servo-control system for the puffer-duct valve in which the effect of control-duct breakage upon the puffer duct valve is minimised. According to the invention the control system includes means which if the servo-pressure lines leading to the valve from a remote control point develop a leak when the valve is in either the closed or the open position, retain the valve in this position notwithstanding the escape of pressure fluid through the leak. In a preferred form of the invention means are also provided which if such failure occurs when the puffer-duct valve is closed, will allow the valve to be opened under the pilot's control to permit a vertical landing operation. In one form of the present invention the servo operation of the puffer-duct valve is controlled switch-valve means actuated by a shuttle member acted upon in each direction by a main cylinder and an auxiliary cylinder, the effective area of each main cylinder being substantially greater than that of the auxiliary cylinder at the opposite side so that pressurisation of a main cylinder will move the shuttle against the resistance of the opposite auxiliary cylinder until, on approaching the end of the shuttle stroke, the switch-valve means are reversed by the operation of the shuttle and thus cause the pressure in the auxiliary cylinders to retain the shuttle in the position reached at the end of the stroke of the shuttle.

Each of the main cylinders communicates permanently with a source of fluid under pressure, for example with a compressor bleed of a turbojet engine, through a restricted orifice, and each is equipped with a vent line leading to a remotely arranged control valve unit, which is preferably mechanically coupled with the jet nozzle or nozzles so that, when the nozzle angle exceeds a predetermined value, for example, 30° to the horizontal, the control valve unit vents that main cylinder which urges the shuttle to the position in which it causes the puffer-duct valve to close, while when the angle is smaller than the predetermined value, the control valve unit vents that main cylinder chamber which urges the shuttle to the "puffer-duct valve open" position, so that the pressure in the opposite main cylinder moves the shuttle to the position in which it causes the puffer-duct valve to close; the shuttle is further arranged to co-operate with a pair of switch valves one of which, when the shuttle is in the "valve open" position, vents that auxiliary cylinder which urges the shuttle to the valve closed position as well as the servo line urging the puffer-duct valve to the closed position, thus allowing the bleed-air pressure from the bleed-air supply to open the puffer-duct valve, and at the same time cut off this auxiliary cylinder from communication with the bleed-air supply, while when the shuttle is in the "valve closed" position this switch valve admits bleed air from the bleed air supply both to this locking cylinder and to the servo duct for closing the puffer duct valve. As the shuttle approaches the valve-closed position, it operates the other switch valve to vent that auxiliary cylinder which urges the shuttle to the valve-open position and cuts the latter auxiliary cylinder off from the bleed-air supply. The passage leading to the remote control valve unit from that main cylinder which urges the shuttle to the valve-open position is further equipped at its shuttle-operating end with a pilot-operated cut-off valve which when operated isolates this passage from the main cylinder in question, thus causing the pressure in the main cylinder to build up and throw the shuttle over to the valve-open position, where it is then retained by the action of the switch valve.

One embodiment of the invention will now be described in more detail with reference to the accompanying drawing, which is a somewhat diagrammatic flow diagram with the valve devices shown in axial section shortly after the jet-nozzle angle has reached the value at which the puffer duct is required to be available.

Referring now to the drawing passage of air from an engine bleed-air supply 1 to a puffer duct system 2, 3 is controlled by a puffer-duct valve element 4 which is axially slidable into and out of co-operation with a valve seat 5. The valve element 4 is formed with a coaxial cylindrical skirt 6, which extends away from the seat 5, and whose inner surface sealingly co-operates with the external surface of a stationary cylinder member 7, with which it forms a cylinder chamber 8. Pressure in this chamber urges the valve element 4 on to its seat 5 and is assisted by a bias spring 9. Servo operation of the puffer-duct valve element 4 is controlled by a shuttle device, generally referred to by number 10, which is arranged in close vicinity to the valve. Air under pressure from supply 1 is admitted to the shuttle device by a passage 11 which, by means of a sliding seal 11a, extends through valve element 4 coaxially therewith, and the cylinder chamber 8 is connected with the shuttle device by a further passage 12. The shuttle device 10 comprises a shuttle member 13 which is axially slidable in a cylnder bore 14. This shuttle member has on each side an annular extension skirt 15 and 16 respectively, the outer circumference of which co-operates with a smaller-diameter extension 17 and 18 respectively of the cylinder bore 14 so that the skirt 15 sub-divides the cylinder space at one side of the shuttle member into an external annular main cylinder 19 and an internal auxiliary cylinder 20 of smaller cross-sectional area; the extension 16 similarly sub-divides the cylinder space at the other side of the shuttle member into an external annular main cylinder 21 of relatively large cross-sectional area and an internal auxiliary cylinder 22 of smaller cross-sectional area.

The first-mentioned main cylinder 19 normally communicates with the bleed-air pressure supply through a restricted orifice 23, and the other main cylinder 21, which is at the opposite side of the shuttle member 13, similarly communicates permanently with the bleed-air supply through a restricted orifice 24. The first-mentioned main cylinder 19 is further connected through a remote-control passage 25 to a port 26 of an automatic remote-control valve unit generally referred-to as 27, and the other main cylinder 21 similarly communicates by a remote-control line 28 with a second port 29 of the remote-control valve unit 27. The remote-control valve unit is illustrated as a spool valve which, in addition to the two ports 26 and 29, is provided with a vent 30, arranged axially between these ports. The valve unit 27 contains a slide-valve spool having a central land 31 which in the illustrated neutral position cuts off the vent 30 from both ports 26 and 29. The spool of valve unit 27 is moved axially by engagement of its screw-threaded spindle 27a with an axially fixed worm-gear nut 32, which is driven by a worm 33, which is illustrated as mounted on the same shaft 33a as a pinion 34 effecting the setting of the jet nozzle 35 of the jet engine or engines of a vertical-take-off and landing (V.T.O.L.) aircraft.

The shuttle 13, whose operation accordingly is controlled by the control valve unit 27 in a manner which will be readily understood by those skilled in the art, controls the servo-operation of the puffer-duct valve 4 by means of a switch-means valve constituted by a poppet type switch valve 36, which is shown in the position to which it is moved by the shuttle 13 when the main cylinder 19 is vented by the slide-valve land 31. In the illustrated example this is the case when the jet nozzle 35 is set at an angle of more than 30° to the horizontal, and the puffer-duct valve 4 is required to be open in this position. In the illustrated position the poppet valve 36 closes a port 37 to cut off communication between line 11, and thus the bleed-air pressure supply 1, and the passage 12 which communicates with the auxiliary cylinder 20 and with the cylinder chamber 8 which serves for closing the valve 4, while the valve 36 is clear of a seat controlling a vent port 38, so that both the cylinder chamber 8 of the puffer-duct valve 4 and the auxiliary cylinder 20 of the shuttle device 10 are now vented to the atmosphere. As a result of the venting of chamber 8, bleed-air pressure in supply line 1 is enabled to move the puffer-duct valve element 4 against its preloading spring 9 to the open position, whereafter bleed air will reach the puffer-duct passages 2 and 3; at the same time the venting of auxiliary cylinder 20 ensures that the shuttle member 13 is retained in its illustrated position even if the remote-control line 28, which communicates with the pressurized main cylinder 21 at the opposite sides of the shuttle, should break and establish communication of the said main cylinder 21 with the atmosphere.

If the set angle of the jet nozzle 35 to the horizontal falls below 30°, the land 31 of the remote-control valve unit 27 will close port 26 of the remote-control passage 25 and open port 29 to vent remote-control passage 28, thus allowing pressure to build up again in main cylinder 19 of the shuttle valve 10 while the opposite main cylinder 21 is vented. The pressure in the main cylinder 19 will therefore now move the shuttle 13 to the opposite position, even if the auxiliary cylinder 22, which opposes such movement, is pressurized. The resulting movement of the shuttle to the opposite end position will remove the constraint on poppet valve 36, allowing it to reverse its position under the action of bleed-air pressure from line 11, so as to cut off passage 12 from vent port 38 and connect it with bleed-air port 37. The cylinder chamber 38 will therefore be charged again with bleed-air pressure, forcing the puffer-duct valve element 4 on to its seat 5, and auxiliary cylinder 20 will also become pressurized to retain the shuttle 13 in its new "valve closed" position. The movement of the shuttle 13 will also force a second type switch valve 39 from its illustrated position, in which it admits bleed-air pressure from line 11 to auxiliary cylinder 22, to a position in which this connection is cut off at port 40, and in which the valve 39 opens a vent port 41, thereby venting the auxiliary cylinder 22 so that the charged opposite auxiliary cylinder 20 will retain the shuttle 13 in the "valve closed" position similarly as previously the charging of auxiliary cylinder 22 together with the venting of cylinder 20 ensured retention of the shuttle in the "valve open" position. It will thus be readily understood that with the device as so far described, if both the remote-control lines 25 and 28, or the pressurised one of these lines, should become open to atmosphere due to breakage of the line or lines, this would result only in removal of pressure from the main cylinder which at the time was pressurised; the corresponding auxiliary cylinder will, however, remain under bleed-air pressure so that the shuttle 13 will stay in the previously established position, and accordingly the puffer-duct valve will remain either open or shut as it has been before the breakage. It will however also be appreciated that if breakage occurs during horizontal flight, i.e. when the puffer duct valve 4 is closed, the impossibility of opening the puffer-duct valve would prevent the aircraft from executing a vertical landing. To avoid this drawback, the illustrated apparatus is further equipped with an over-ride valve 43 operable by a solenoid 42, both these elements being arranged closely adjacent to the puffer-duct valve and its shuttle unit 10. When the solenoid 42 is energised under the pilot's control, the over-ride valve 43 closes a port to cut off communication between that main cylinder 21 which serves to move the shuttle 13 to the "valve open" position, and the associated remote-control line 28. Energisation of the solenoid 42 will therefore cause the main cylinder 21 to become pressurised through orifice 24 irrespective of any breakage in the remote-control line 28, and to move the shuttle 13 to the "valve open" position, in which it will then be secured by appropriate pressurisation of auxiliary cylinder 20 and venting of auxiliary cylinder 22 by means of the switch valves 36 and 39 respectively.

Various details of the embodiment described with reference to the accompanying drawings may be modified without exceeding the scope of the present invention. Thus the construction of the puffer-duct valve and its actuating cylinder 8 may be replaced by any alternative construction producing similar operation, and the spool-type slide-valve element of the remote-control valve unit 27 may be replaced if desired by a pair of poppet valves alternatively opened by movement of a control spindle in one or the other direction from a neutral position. This neutral position itself may be arranged to correspond to an angle which may be different from the 30° assumed in the embodiment described.

What we claim is:

1. A system for the remote control, in a V.T.O.L. aircraft, of a pneumatically operated puffer-duct shut-off valve, which comprises a valve-operating shuttle movable between a first position in which it is operative to produce pneumatic opening, and a second position in which it is operative to produce pneumatic closing, of the shut-off valve, the shuttle including a first and a second main piston means, respectively forming part of first and second main cylinder means operative, when pneumatic pressure is applied thereto, to move the shuttle to said first and second positions respectively, and a first and a second auxiliary piston means, respectively forming part of first and second auxiliary cylinder means operative, when pneumatic pressure is applied thereto, to bias the shuttle to said first and second positions respectively, the areas of said first and said second auxiliary piston means being smaller than the areas of said second and said first main piston means respectively, a pilot control unit, two remote-control lines extending from the pilot control unit to one each of said main cylinder means, and a first and second switch valve respectively associated with the first and second auxiliary cylinder means and each having a first position for applying pneumatic pressure to the associated auxiliary cylinder means and a second position for removing such pressure, means biasing each said switch valve to its first position, and abutment means operatively connecting each switch valve with said shuttle to move the second switch valve to its second position against its bias means as the shuttle approaches its first position for opening the shut-off valve, and to move the first switch valve to its second position against its bias means as the shuttle approaches its second position for closing the shut-off valve.

2. A system as claimed in claim 1, which includes an over-ride valve operable to apply pneumatic pressure to said first main cylinder means independently of the position of said pilot control unit, and remote-control means for operating said over-ride valve.

3. A system as claimed in claim 2, wherein the shut-off valve is biased to its open position by its upstream pressure, the system including a single-acting cylinder means operative when pneumatic pressure is applied thereto, to close the shut-off valve against the action of its upstream pressure, the system including passage means interconnecting said single-acting cylinder means with the second auxiliary-cylinder means, and a pair of restricted passages respectively interconnecting the first and second main cylinders with the upstream side of the shut-off valve, the first and second switch valve each having an exhaust port, a service port communicating with the first and second auxiliary cylinder respectively, and a pressure port communicating with the upstream side of the shut-off valve, the control-valve unit being operative to selectively vent one or the other control line, and each switch valve being constructed to be biased to a normal position in which its service port communicates with the pressure port.

4. A system as claimed in claim 3, in which the said over-ride valve is included in the first remote-control line and is a normally open valve at a point adjacent to the shuttle.

References Cited
UNITED STATES PATENTS

| | | | |
|---|---|---|---|
| 2,608,997 | 9/1952 | Raven | 251—27 |
| 2,692,581 | 10/1954 | Ziebolz | 251—27 X |
| 3,255,993 | 6/1966 | Hill | 251—29 |

M. CARY NELSON, *Primary Examiner.*

A. ROSENTHAL, *Examiner.*